United States Patent Office 3,114,700
Patented Dec. 17, 1963

3,114,700
SWEETENING OF SOUR HYDROCARBON DISTILLATES
William L. Cox, Mount Prospect, Ill., assignor to Universal Oil Products Company, Des Plaines, Ill., a corporation of Delaware
No Drawing. Filed May 8, 1962, Ser. No. 193,312
9 Claims. (Cl. 208—206)

This invention relates to a novel method for effecting sweetening of sour hydrocarbon distillates.

One method of sweetening a sour hydrocarbon distillate and particularly cracked gasoline entails the use of a phenylene diamine compound. Because the phenylene diamine compound also serves as an oxidation inhibitor, this process is referred to as "inhibitor sweetening."

In one embodiment the present invention is directed to an improvement in the inhibitor sweetening process using the phenylene diamine compound. It is understood that the novel method of the present invention may be used with other inhibitors which possess the property of effecting sweetening of hydrocarbon distillates.

When employed in conjunction with inhibitor sweetening utilizing a phenylene diamine compound, the present process offers the advantage of effecting sweetening of the sour hydrocarbon distillate in a shorter period of time. This accelerated sweetening is important to the refiner in many cases because, due to the shortage of storage capacity or in order to comply with shipping schedules or for other reasons, it is often necessary to transport or use the distillate as soon as possible, and the refiner cannot afford to wait until sufficient time has elapsed for the distillate to become sweet.

In one embodiment the present invention relates to a method for sweetening a sour hydrocarbon distillate which comprises contacting said distillate in the presence of an oxidizing agent with an inhibitor-sweetening agent and an N-alkyl-alkanolamine.

In a specific embodiment the present invention relates to a method for sweetening sour cracked gasoline which comprises contacting said gasoline in the presence of air with a phenylene diamine inhibitor and N-octyl-ethanolamine.

As hereinbefore set forth, while the phenylene diamine inhibitors are effective sweetening agents, it is of extreme advantage to accelerate the sweetening reaction and thereby reduce the time required for this purpose. In addition to serving as an active agent to accelerate the inhibitor sweetening, it is essential that the accelerating agent is completely compatible with both the hydrocarbon distillate and the phenylene diamine inhibitor. The accelerating agent must be completely soluble in the hydrocarbon distillate and must not precipitate out of solution during storage.

Any suitable inhibitor sweetening agent is used in accordance with the present invention. The inhibitor sweetening agent preferably is a phenylene diamine inhibitor. Any suitable phenylene diamine inhibitor is used and preferred inhibitors comprise N,N'-di-isopropyl-p-phenylene diamine, N,N'-di-sec-butyl-phenylene diamine, N,N'-di-sec-heptyl-p-phenylene diamine and N,N'-di-sec-octyl-p-phenylene diamine. Other phenylene diamine compounds include N,N'-di-propyl-p-phenylene diamine, N,N'-di-butyl-p-phenylene diamine, N,N'-di-amyl-p-phenylene diamine, N,N'-di-hexyl-p-phenylene diamine, N,N'-di-heptyl-p-phenylene diamine, N,N'-di-octyl-p-phenylene diamine, N,N'-di-nonyl-p-phenylene diamine, N,N'-di-decyl-p-phenylene diamine, N,N'-di-undecyl-p-phenylene diamine, N,N''-di-dodecyl-p-phenylene diamine, N,N'-di-tridecyl-p-phenylene diamine, N,N'-di-tetradecyl-p-phenylene diamine, N,N'-di-pentadecyl-p-phenylene diamine, N,N'-di-hexadecyl-p-phenylene diamine, N,N'-di-heptadecyl-p-phenylene diamine, N,N'-di-octadecyl-p-phenylene diamine, N,N'-di-nonadecyl-p-phenylene diamine, N,N'-di-eicosyl-p-phenylene diamine, etc. In general, it is preferred that the aliphatic groups are secondary alkyl as in compounds including N,N'-di-isopropyl-p-phenylene diamine, N,N'-di-sec-butyl-p-phenylene diamine, N,N'-di-sec-amyl-p-phenylene diamine, N,N'-di-sec-hexyl-p-phenylene-diamine, N,N'-di-sec-heptyl-p-phenylene diamine, N,N'-di-sec-octyl-p-phenylene diamine, etc. Usually, both aliphatic groups will be the same but in some cases they may be different as in such compounds as N-isopropyl-N'-sec-butyl-p-phenylene diamine, N-isobutyl-N'-sec-amyl-p-phenylene diamine, N-isopropyl-N'-sec-hexyl-p-phenylene diamine, N-isopropyl-N'-sec-heptyl-p-phenylene diamine, etc., N-sec-butyl-N'-sec-amyl-p-phenylene diamine, N-sec-butyl-N'-sec-hexyl-p-phenylene diamine, N-sec-butyl-N'-sec-heptyl-p-phenylene diamine, N-sec-butyl-N'-sec-octyl-p-phenylene diamine, etc. It is understood that these various phenylene diamine compounds are not necessarily equivalent. The phenylene diamine compound usually will be employed in a concentration of from about 0.0001% to about 1% and more particularly in a concentration of from about 0.0005% to about 0.05% by weight of the hydrocarbon distillate.

While the use of the accelerating agent with a phenylene diamine inhibitor comprises a preferred embodiment of the present invention, it is understood that the accelerating agent may be used along with other inhibitor compounds which also possess sweetening properties. In geenral, these inhibitors are amine type and more particularly aromatic diamine compounds. An illustrative inhibitor of this type comprises a para-amino-diphenyl amine and particularly a para-alkyl-amino-diphenyl amine including such compounds as para-amino-diphenyl amine, para-isopropyl-amino-diphenyl amine, para-sec-butylamino-diphenyl amine, para-sec-amylamino-diphenyl amine, para-sec-hexylamino diphenyl amine, para-sec-heptylamino-diphenyl amine, para-sec-octylamino-diphenyl amine, para-sec-nonylamino-diphenyl amine, para-sec-decylamino-diphenyl amine, para-sec-undecylamino-diphenyl amine, para-sec-dodecylamino-diphenyl amine, etc. It is understood that one or both of the aromatic rings may contain substituents and particularly alkyl groups attached thereto and also that the para nitrogen atom may contain two hydrocarbon groups and particularly alkyl groups attached thereto. It is understood that these inhibitor compounds are not necessarily equivalent.

The novel sweetening accelerator agent of the present invention is an N-alkyl-alkanolamine. As will be shown by the examples appended to the present specifications, the N-alkyl-alkanolamine by itself does not catalyze oxidative sweetening of sour gasoline. Accordingly, it is surprising that the N-alkyl-alkanolamine serves to accelerate the sweetening potency of the phenylene diamine inhibitors. Normally it would be expected that a compound which accelerates a certain reaction would in itself cause such reaction to occur. However, as mentioned above, the novel accelerating agent of the present invention is not effective in catalyzing oxidative sweetening of sour distillates, but does accelerate the phenylene diamine inhibitors in effecting such sweetening.

Any suitable N-alkyl-alkanolamine is used in accordance with the present invention. Preferably the N-alkyl-alkanolamine contains from 4 to 30 and still more preferably from 6 to 15 carbon atoms in said alkyl, and from 2 to 6 and still more preferably from 2 to 4 carbon atoms in said alkanol. The alkanol group also may be described as a lower alkanol group and, when so used, is intended to mean alkanol groups containing from 2 to 6 and preferably from 2 to 4 carbon atoms.

A particularly preferred N-alkyl-alkanolamine for use in the present invention is N-sec-octyl-ethanolamine. Other N-alkyl-alkanolamines comprise N-butyl-ethanolamine, N-amyl-ethanolamine, N-hexyl-ethanolamine, N-heptyl-ethanolamine, N-octyl-ethanolamine, N-nonyl-ethanolamine, N-decyl-ethanolamine, N-undecyl-ethanolamine, N-dodecyl-ethanolamine, N-tridecyl-ethanolamine, N-tetradecyl-ethanolamine, N-pentadecyl-ethanolamine, N-hexadecyl-ethanolamine, N-heptadecyl-ethanolamine, N-octadecyl-ethanolamine, N-nonadecyl-ethanolamine, N-eicosyl-ethanolamine, N-heneicosyl-ethanolamine, N-docosyl-ethanolamine, N-tricosyl-ethanolamine, N-tetracosyl-ethanolamine, N-pentacosyl-ethanolamine, N-hexacosyl-ethanolamine, N-heptacosyl-ethanolamine, N-octacosyl-ethanolamine, N-nonacosyl-ethanolamine, N-triacontyl-ethanolamine, etc., N-butyl-propanolamine, N-amyl-propanolamine, N-hexyl-propanolamine, N-heptyl-propanolamine, N-octyl-propanolamine, N-nonyl-propanolamine, N-decyl-propanolamine, N-undecyl-propanolamine, N-dodecyl-propanolamine, N-tridecyl-propanolamine, N-tetradecyl-propanolamine, N-pentadecyl-propanolamine, N-hexadecyl-propanolamine, N-heptadecyl-propanolamine, N-octadecyl-propanolamine, N-nonadecyl-propanolamine, N-eicosyl-propanalamine, N-heneicosyl-propanolamine, N-docosyl-propanolamine, N-tricosyl-propanolamine, N-tetracosyl-propanolamine, N-pentacosyl-propanolamine, N-hexacosyl-propanolamine, N-heptacosyl - propanolamine, N - octacosyl-propanolamine, N - nonacosyl-propanolamine, N - triacontyl-propanolamine, etc., N - butyl- butanolamine, N - amyl-butanolamine, N - hexyl - butanolamine, N - heptyl-butanolamine, N - octyl - butanolamine N - nonyl-butanolamine, N-decyl-butanolamine, N-undecyl-butanolamine, N-dodecyl-butanolamine, N-tridecyl-butanolamine, N-tetradecyl-butanolamine, N-pentadecyl-butanolamine, N-hexadecyl - butanolamine, N-heptadecyl-butanolamine, N - octadecyl-butanolamine, N-nonadecyl-butanolamine, N-eicosyl-butanolamine, N-heneicosyl-butanolamine, N-docosyl-butanolamine, N-tricosyl-butanolamine, N-tetracosyl-butanolamine, N-pentacosyl-butanolamine, N-hexacosyl-butanolamine, N-heptacosyl-butanolamine, N-octacosyl-butanolamine, N-nonacosyl-butanolamine, N-triacontyl-butanolamine, etc., N-butyl-pentanolamine, N-pentyl-pentanolamine, N-hexyl-pentanolamine, N-heptyl-pentanolamine, N-octyl-pentanolamine, N-nonyl-pentanolamine, N-decyl-pentanolamine, N-undecyl-pentanolamine, N-dodecyl-pentanolamine, N-tridecyl-pentanolamine, N-tetradecyl-pentanolamine, N-pentadecyl-pentanolamine, N - hexadecyl - pentanolamine, N-heptadecyl-pentanolamine, N - octadecyl-pentanolamine, N - nonadecyl-pentanolamine, N-eicosyl-pentanolamine, N-heneicosyl-pentanolamine, N - docosyl-pentanolamine, N-tricosyl - pentanolamine, N-tetracosyl-pentanolamine, N-pentacosyl - pentanolamine, N-hexacosyl-pentanolamine, N-heptacosyl-pentanolamine, N-octacosyl-pentanolamine, N-nonacosyl-pentanolamine, N-triacontyl-pentanolamine, etc., N-butyl-hexanolamine, N-amyl-hexanolamine, N-hexyl-hexanolamine, N-heptyl-hexanolamine, N-octyl-hexanolamine, N-nonyl-hexanolamine, N-decyl-hexanolamine, N - undecyl-hexanolamine, N-dodecyl-hexanolamine, N-tridecyl-hexanol-amine, N-tetradecyl-hexanolamine, N-pentadecyl-hexanolamine, N-hexadecyl-hexanolamine, N-heptadecyl-hexanolamine, N-octadecyl-hexanolamine, N-nonadecyl-hexanolamine, N-eicosyl-hexanolamine, N-heneicosyl-hexanolamine, N-docosyl-hexanolamine, N-tricosyl-hexanolamine, N-tetracosyl-hexanolamine, N-pentacosyl-hexanolamine, N-hexacosyl-hexanolamine, N-heptacosyl-hexanolamine, N-octacosyl-hexanolamine, N-nonacosyl-hexanolamine, N-triacontyl-hexanolamine, etc.

In a preferred embodiment the alkyl is a secondary alkyl group and particularly preferred compounds include N-sec-hexyl-ethanolamine, N-sec-heptyl-ethanolamine, N-sec-octyl-ethanolamine, N-sec-nonyl-ethanolamine, N-sec-decyl-ethanolamine, N-sec-undecyl-ethanolamine, N-sec-dodecylethanolamine, etc.

The N-alkyl-alkanolamines may be obtained from any suitable source or may be prepared in any suitable manner. When the secondary-alkyl substituted compounds are desired, these may be prepared by the reductive alkylation of the alkanolamine with a ketone, generally at a temperature of from about 100° to about 500° F. and a hydrogen pressure of from about 100 to 2000 pounds or more per square inch. Any suitable reductive alkylation catalyst may be employed. One catalyst comprises an intimate mixture of copper oxide, chromium oxide and barium oxide. Other catalysts contain nickel, copper, molybdenum, platinum, palladium, etc., or mixtures thereof, which may be present as the metal, oxide and/or compounds thereof. When the n-alkyl-substituted compounds are desired, these are prepared by reductive alkylation using the corresponding aldehyde.

The N-alkyl-alkanolamine is used in any suitable concentration which may range from about 1% to about 50% by weight of the inhibitor sweetening agent. Generally, the sweetening accelerator will be used in as low a concentration as is suitable, and thus preferably is used in a concentration of from about 1% to about 25% and still more particularly from about 4% to about 12% by weight of the inhibitor sweetening compound.

The use of the N-alkyl-alkanolamine in combination with the phenylene diamine or other inhibitor offers numerous advantages over the use of the phenylene diamine or other inhibitor alone. As hereinbefore set forth, this results in faster sweetening and therefore permits the refiner to transport or use the hydrocarbon distillate at an earlier date. Furthermore, the amount of phenylene diamine inhibitor to be employed may be less than that required in the absence of the accelerator. Still further, the use of these two types of compounds appears to exert a synergistic effect in the inhibitor sweetening reaction, and this may serve to effect sweetening of some hydrocarbon distillates which do not respond to the use of the inhibitor compound alone.

Because the sweetening reaction includes the conversion of mercaptans to disulfides, presumably through an oxidation reaction, it is essential that air or other oxidizing agent be present in the reaction. Generally sufficient air will be dissolved or entrained in the hydrocarbon distillate in order to satisfy this requirement. However, when sufficient air is not so dissolved, air from an extraneous source may be added to the hydrocarbon distillate. It is understood that oxygen or other oxygen-containing gases may be used in place of air. In some cases other oxidizing agents such as peroxides, permanganates, etc. may be employed.

In general, it is preferred to effect the sweetening in the presence of an alkaline reagent. Generally the alkaline reagent will be used in a small amount which usually will not exceed about 5% to 10% by weight of the hydrocarbon distillate. For convenience in the subsequent separation, the alkaline reagent preferably comprises an aqueous solution thereof. Usually the hydrocarbon distillate is subjected to pretreatment with an alkaline reagent in order to remove a major proportion of the mercaptans contained in the distillate. Conveniently the aqueous solution of alkaline reagent used in the sweetening comprises the same solution used to pretreat the hydrocarbon distillate. In some cases, an alkaline solution is entrained in the hydrocarbon distillate after such pretreatment and may be sufficient for effecting the sweetening. Preferred alkaline solutions comprise aqueous solutions of caustic (sodium hydroxide), potassium hydroxide, etc.

The process of the present invention may be effected in any suitable manner whereby the hydrocarbon distillate is intimately contacted with the additives. In a preferred method, the N-alkyl-alkanolamine and phenylene diamine or other inhibitor are commingled with the hydrocarbon stream and the resultant mixture is passed through suitable mixing devices such as durion mixers, orifice mixers, etc. The resultant mixture then is passed into a storage tank, which, when desired, may contain suitable stirring means such as mixing paddles, etc. to effect further mixing of the components therein. When desired, the inhibitor and accelerator may be added separately to the hydrocarbon distillate. If sufficient air is not contained in the hydrocarbon distillate, air or other oxygen-containing gas may be introduced directly into the storage tank or it may be supplied to the stream of hydrocarbon distillate before or after mixing with the inhibitor-accelerator composition. Similarly, if sufficient alkaline reagent is not present in the hydrocarbon distillate, it may be commingled with the hydrocarbon stream before or after mixing with the other components or it may be supplied directly to the storage tank.

The sweetening of the present invention is readily effected at atmospheric temperature which generally ranges from about 50° to about 100° F. However, in some cases, it may be desirable to utilize elevated temperatures which may range up to 150° F. or more.

While this process is particularly applicable for the treatment of cracked gasoline, it is understood that, with suitable modification, the process may be utilized for the treatment of straight run and/or natural gasoline or mixtures thereof with cracked gasoline, as well as cracked and/or straight run higher boiling hydrocarbon distillates including jet fuel, kerosene, diesel fuel, burner oil, lubricating oil, gas oil, etc.

The following examples are introduced to illustrate further the novelty and utility of the present invention but not with the intention of unduly limiting the same.

*Example I*

The gasoline used in this example is a commercial blended gasoline. The gasoline, as received, was doctor sweet and, accordingly, the gasoline was made sour by adding n-octyl mercaptan in a concentration to provide a mercaptan sulfur content of about 164 parts per million. This sour gasoline then was used in the following evaluations.

Different samples of the gasoline, with and without various additives, each were stored in brown glass bottles at room temperature over a layer of 5% by volume of 10° Baumé caustic. The bottles were capped loosely so that air penetrated into the gasoline. The samples were inspected periodically to determine whether they were sweet to the doctor test.

A sample of the sour gasoline containing 0.003% by weight of N,N'-di-(1-ethyl-3-methylpentyl)-p-phenylene diamine, when evaluated in the above manner, still was positive to the doctor test after 91 hours in storage. On the other hand, another sample of the gasoline containing 0.003% by weight of a mixture of 95% by weight of N,N' - di - (1 - ethyl-3-methylpentyl)-p-phenylene diamine and 5% by weight of N-(1-methylheptyl)-ethanolamine was negative to the doctor test after 67 hours. Accordingly, it is seen that the N-(1-methylheptyl)-ethanolamine served to accelerate inhibitor sweetening and to produce a sweet product in a much shorter time than is obtained by the phenylene diamine inhibitor alone.

*Example II*

Another sample of the sour gasoline described in Example I was prepared to contain 0.003% by weight of N,N'-di-sec-butyl-p-phenylene diamine inhibitor. This sample was positive to the doctor test after 67 hours in storage. In contrast, another sample of the same gasoline containing 0.003% by weight of a mixture of 95% by weight of N,N'-di-sec-butyl-p-phenylene diamine and 5% by weight of N-(1-methylheptyl)-ethanolamine was negative to the doctor test after about 45 hours. Here again, it will be seen that the N-(1-methylheptyl)-ethanolamine served to accelerate the inhibitor sweetening of the gasoline.

*Example III*

Another series of tests similar to that described in Example I was conducted using 0.006% by weight of the inhibitor. In a sample of the gasoline containing 0.006% by weight of N,N'-di-(1-ethyl-3-methylpentyl)-p-phenylene diamine, the gasoline still was positive to the doctor test after 91 hours in storage. In contrast, a sample containing 0.006% by weight of a mixture of 95% by weight of N,N'-di-(1-ethyl-3-methylpentyl)-p-phenylene diamine and 5% by weight of N-(1-methylheptyl)-ethanolamine was negative to the doctor test after 42 hours in storage.

*Example IV*

Another series of tests was conducted similar to those described in Example II, except that the inhibitor was used in a concentration of 0.006% by weight. A sample of the gasoline containing 0.006% by weight of N,N'-di-sec-butyl-p-phenylene diamine was positive to the doctor test after about 65 hours in storage. However, another sample of the gasoline containing 0.006% by weight of a mixture of 95% by weight of N,N'-di-sec-butyl-p-phenylene diamine and 5% by weight of N-(1-methylheptyl)-ethanolamine was negative to the doctor test after only 25 hours in storage. Again the effectiveness of the N-alkyl-ethanolamine to accelerate inhibitor sweetening is demonstrated.

*Example V*

Still another series of tests similar to that described in Example I was conducted using 0.009% by weight of inhibitor. Another sample of the gasoline containing 0.009% by weight of N,N'-di-(1-ethyl-3-methylpentyl)-p-phenylene diamine was positive to the doctor test after 91 hours in storage. However, another sample of the gasoline containing a mixture of 95% by weight of N,N'-di-(1-ethyl-3-methylpentyl)-p-phenylene diamine and 5% by weight of N-(1-methylheptyl)-ethanolamine was negative to the doctor test after only 25 hours in storage. It will be seen that the N-(1-methylheptyl)-ethanolamine served to considerably accelerate sweetening of the gasoline.

*Example VI*

Still another series of tests was made similar to that described in Example II, except that the inhibitor was used in a concentration of 0.009% by weight. Another sample of the gasoline containing 0.009% by weight of N,N'-di-sec-butyl-p-phenylene diamine was positive to the doctor test after 49 hours in storage. In contrast, another sample of the gasoline containing a mixture of 95% by weight of N,N'-di-sec-butyl-p-phenylene diamine and 5% by weight of N-(1-methylheptyl)-ethanolamine was sweet to the doctor test after only 19 hours in storage. It is seen that the N-(1-methylheptyl)-ethanolamine served to considerably accelerate sweetening of the gasoline.

*Example VII*

An interesting observation is made from the data presented in Examples I through VI. A three-fold increase in the concentration of the phenylene diamine inhibitors alone increased the rate of sweetening only about 10%. In contrast, a three-fold increase in the concentration of the mixtures of phenylene diamine inhibitor and (N-(1-methylheptyl)-ethanolamine increased the rate of sweetening by about 50%.

*Example VIII*

As hereinbefore set forth, N-(1-methylheptyl)-ethanolamine by itself does not catalyze oxidative sweetening of sour gasoline. Another evaluation is made in substantially the same manner as described in Examples I, III and V, but omitting the phenylene diamine inhibitor. In concentrations of N-(1-methylheptyl)-ethanolamine ranging from 0.003% to 0.009% by weight of gasoline, substantially no difference in the time required for sweetening is noticed in the samples containing the N-(1-methylheptyl)-ethanolamine and in control samples of the gasoline which do not contain the N-(1-methylheptyl)-ethanolamine or the phenylene diamine inhibitors.

*Example IX*

A series of tests was made in substantially the same manner as described in Example I, except that the inhibitor was used in a concentration of 0.01% by weight. Another batch of the gasoline described in Example I was soured with n-octyl mercaptan to a concentration of about 228 parts per million. A sample of this gasoline containing 0.01% by weight of N,N'-di-(1-ethyl-3-methylpentyl)-p-phenylene diamine was positive to the doctor test after 141 hours in storage. The inhibitor-accelerator composition of this example contained 90% by weight of N,N'-di-(1-ethyl-3-methylpentyl)-p-phenylene diamine and 10% by weight of N-(1-methylheptyl)-ethanolamine. Another sample of the gasoline containing 0.01% by weight of this mixture was negative to the doctor test after 22 hours in storage. A control sample of the gasoline (not containing these additives) was positive to the doctor test after 141 hours in storage, at which time the evaluation was discontinued.

*Example X*

In addition to effecting rapid sweetening of the gasoline, it is also important that other properties of the gasoline, such as the induction period, are not deleteriously affected by additives. The induction periods of the gasoline samples of Example IX after sweetening were obtained as follows. The control sample of the gasoline (not containing additives) had an induction period of 75 minutes. The sample of gasoline containing the phenylene diamine inhibitor alone had an induction period of 280 minutes. The sample of gasoline containing the mixture of phenylene diamine inhibitor and N-(1-methylheptyl)-ethanolamine had an induction period of 285 minutes. Accordingly, it will be noted that the N-(1-methylheptyl)-ethanolamine did not adversely affect the induction period of the gasoline.

*Example XI*

The gasoline used in this example is a sour Canadian light catalytic cracked gasoline containing 32 parts per million of mercaptan sulfur. A sample of this gasoline containing 0.002% by weight of N,N'-di-(1-ethyl-3-methylpentyl)-p-phenylene diamine became doctor sweet after 43 hours in storage. However, another sample of the gasoline containing 0.002% by weight of a mixture of 90% by weight of N,N'-di-(1-ethyl-3-methylpentyl)-p-phenylene diamine and 10% by weight of N-(1-methylheptyl)-ethanolamine was negative to the doctor test after 24 hours in storage.

*Example XII*

This example illustrates the results when using a commercial catalytically cracked gasoline. After about three days storage at 100° F., the mercaptan sulfur content of a sample of the gasoline is 0.0192% by weight. The addition of 0.005% by weight of N,N'-di-sec-butyl-p-phenylene diamine to another sample of the gasoline reduces the mercaptan sulfur content after about three days to 0.0045%. However, the addition of both 0.005% by weight of N,N'-di-sec-butyl-p-phenylene diamine and 0.0025% by weight of N-(1-ethyl-3-methylpentyl)-ethanolamine reduces the mercaptan content of the gasoline to about 0.0005% by weight after three days storage. The change in mercaptan concentration was followed by periodic electrometric titration with 0.01 N alcoholic silver nitrate solution. Here again, it will be noted that the use of the accelerator in conjunction with the inhibitor considerably accelerates sweetening.

*Example XIII*

The inhibitor of this example is N,N'-di-sec-heptyl-p-phenylene diamine and the accelerator is N-sec-decyl-propanolamine. When added in a concentration of 0.008% by weight of the inhibitor and 0.002% by weight of the accelerator, sweetening of sour kerosene is effected in a shorter time than otherwise is required when using the inhibitor alone.

*Example XIV*

The inhibitor compound of this example comprises N,N'-di-isopropyl-p-phenylene diamine. When used in a concentration of 0.003% by weight along with 0.002% by weight of N-sec-hexyl-butanolamine, sweetening of sour gasoline is accelerated.

*Example XV*

The inhibitor-accelerator composition of this example is N,N'-bis-(1-phenylethyl)-p-phenylene diamine and N-butyl-hexanolamine. When used in a concentration of 0.1% by weight of inhibitor and 0.05% by weight of accelerator, sweetening of sour cracked gasoline is accelerated.

I claim as my invention:

1. The method of sweetening a sour hydrocarbon distillate which comprises contacting said distillate in the presence of an oxidizing agent and an alkaline reagent with an inhibitor sweetening agent and an accelerator therefor comprising an N-alkyl-alkanolamine.

2. The method of sweetening a sour hydrocarbon distillate which comprises contacting said distillate in the presence of an oxidizing agent and an alkaline reagent with an inhibitor sweetening agent and an accelerator therefor comprising an N-alkyl-alkanolamine containing from 4 to 30 carbon atoms in said alkyl and from 2 to 6 carbon atoms in said alkanol.

3. The method of sweetening a sour hydrocarbon distillate which comprises contacting said distillate in the presence of air and an alkaline reagent with a phenylene diamine inhibitor and a sweetening accelerator comprising an N-alkyl-lower alkanolamine containing from 6 to 15 carbon atoms in said alkyl.

4. The method of sweetening sour gasoline which comprises contacting said gasoline in the presence of air and an alkaline reagent with a phenylene diamine inhibitor and a sweetening accelerator comprising an N-alkyl-lower alkanolamine.

5. The method of sweetening sour gasoline which comprises contacting said gasoline in the presence of air and an alkaline reagent with a phenylene diamine inhibitor and a sweetening accelerator comprising an N-alkyl-lower alkanolamine and retaining the resultant mixture in storage at a temperature of from about 50° to about 150° F. until the gasoline is substantially sweet.

6. The method of sweetening sour gasoline which comprises contacting said gasoline in the presence of air and an alkaline reagent with N,N'-di-sec-butyl-p-phenylene diamine and a sweetening accelerator comprising N-sec-octyl-ethanolamine.

7. The method of sweetening sour gasoline which comprises contacting said gasoline in the presence of air and an alkaline reagent with N,N'-di-sec-heptyl-p-phenylene diamine and a sweetening accelerator comprising N-sec-octyl-ethanolamine.

8. The method of sweetening sour gasoline which comprises contacting said gasoline in the presence of air and an alkaline reagent with N,N'-di-sec-octyl-p-phenylene diamine and a sweetening accelerator comprising N-sec-octyl-ethanolamine.

9. The method of sweetening sour gasoline which comprises contacting said gasoline in the presence of air and an alkaline reagent with N,N'-di-isopropyl-p-phenylene diamine and a sweetening accelerator comprising N-sec-octyl-ethanolamine.

References Cited in the file of this patent

UNITED STATES PATENTS 2,978,404    Bowers _____ Apr. 4, 1961